Aug. 19, 1941.   I. E. MUSKAT ET AL   2,253,471
CHLORINATION OF TITANIUM BEARING MATERIALS
Filed Feb. 8, 1940
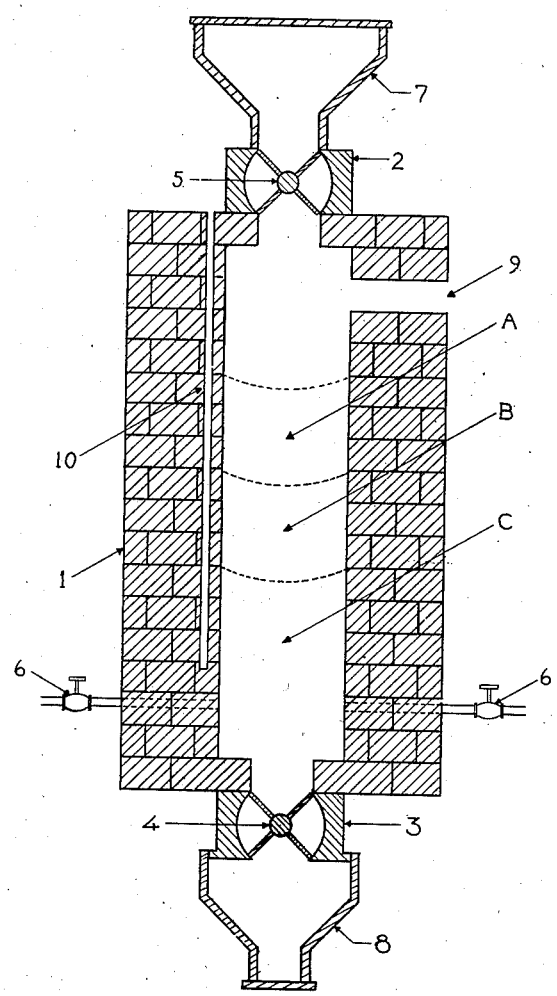
INVENTOR.
IRVING E. MUSKAT
& ROBERT H. TAYLOR
BY
ATTORNEY.

Patented Aug. 19, 1941

2,253,471

UNITED STATES PATENT OFFICE 2,253,471

CHLORINATION OF TITANIUM BEARING MATERIALS

Irving E. Muskat and Robert H. Taylor, Akron, Ohio, assignors to Pittsburgh Plate Glass Company, Allegheny County, Pa., a corporation of Pennsylvania Application February 8, 1940, Serial No. 317,874

14 Claims. (Cl. 75—112)

This invention relates to the chlorination of titanium ores and is particularly adapted to the chlorination of materials containing compounds of titanium such as rutile, titanium dioxide, ferro titanates, titanium carbides, etc., and is particularly directed to the treatment of ores such as ilmenite which contain in excess of 10 percent iron and 10 percent titanium. In the chlorination of such ores, it is known to conduct the chlorination in a continuous process by forming a pervious bed of the ore and passing chlorine through the bed, whereby the ore is chlorinated. In accordance with the process outlined in our Patent No. 2,184,887, briquettes comprising a mixture of ore and carbon may be introduced into a shaft furnace and chlorine introduced into the base of the furnace. In this manner the ore and chlorine flow countercurrently and a rapid chlorination is effected. In many cases, however, the process results in an incomplete utilization of the chlorine introduced. Thus, chlorine introduced into the base of the furnace becomes diluted with carbon dioxide, carbon monoxide, and iron and/or titanium chlorides as the gas passes through the bed until, as it reaches the upper portion of the bed, the chlorine concentration in the gases is relatively low. This dilute chlorine gas contacts the incoming ore and since the chlorination of this ore is not immediately initiated, a portion of the chlorine is swept out of the chlorination zone, thus reducing the chlorine utilization.

In accordance with the present invention, we have found that this loss of chlorine may be substantially minimized by conducting the chlorination within the bed in a series of stages. We have determined that upon conducting the chlorination of a bed of substantial depth, for example, 18 inches or more, preferably not substantially less than 2 to 3 feet, the chlorination of the ore occurs in steps. In accordance with this process, the ore introduced into the furnace contacts the hot outgoing gases containing chlorine, iron chloride and/or titanium tetrachloride and is heated up to reaction temperature and the reaction is initiated. Thus, the upper portion of the bed, which in general, possesses a depth of at least about 3 inches, and preferably in excess of 6 inches, serves as a preheating zone wherein little or no chlorine is taken up by the ore. As the ore proceeds downwardly it enters the upper portion of the chlorination zone. In this portion of the chlorination zone the iron component of the ilmenite or similar ore is rapidly chlorinated and iron chloride is formed and vaporized. Only a minor quantity of the titanium components of the ore are attacked, in this zone, and in consequence, the titanium content of the unchlorinated residue increases to a substantial degree. In the lower portion of the chlorination zone which may be substantially equal in depth to the depth of the zone in which the iron component is chlorinated, the titanium residue is contacted with the substantially more concentrated chlorine entering the base of the ore bed and is thus almost completely chlorinated due to the high temperature within the ore bed and to the presence of chlorine in high concentration undiluted by ferric or other chlorides.

It is readily apparent that in order to conduct the chlorination in accordance with this process, the ore bed should be of substantial thickness and, in general, it is desirable that the total thickness of the ore bed measured from the top of the bed to the point of chlorine introduction should be at least 18 inches and preferably above 2 to 3 feet. By operation in this manner, it will be readily understood that the titanium components which normally are difficult to chlorinate are subjected to the action of chlorine in high concentration and therefore are chlorinated under conditions more nearly optimum for complete chlorination of the titanium values. The iron components being more easily chloridizable are effectively chlorinated in the upper portion of the chlorination zone.

This method permits an effective utilization of chlorine. However, in operating the furnace at maximum capacity in order to increase the output of titanium tetrachloride a substantial portion of the chlorine often remains unreacted even when relatively deep beds are used. This appears to be due in part to the fact that the initiation of chlorination of the ore is not sufficiently rapid to permit effective utilization of high volumes of chlorine passing through the furnace.

The amount of unreacted chlorine may be substantially minimized by maintaining the top of the ore bed at least 6 inches and preferably not less than one foot from the hottest portion of the ore bed. This depth may be measured by providing the furnace with a suitable well for introduction of thermocouple wires, whereby the temperature within the furnace may be measured and the location of the hottest portion of the bed established. This method is described in our copending application Serial No. 306,877, filed Nov. 30, 1939.

In accordance with another modification, it is possible to minimize or eliminate chlorine loss and to reduce the amount of chlorine in the escaping gases, thereby reducing the corrosive properties thereof by introducing a more easily chloridizable material into the furnace with the ore undergoing chlorination. Thus, metals or metallic oxides such as iron, zinc, titanium, chromium, scrap stainless steel or other chromium alloy, ferrotitanium, ferrochromium, aluminum or metallic oxide such as ferrous or ferric oxide, aluminum oxide, zinc oxide, chromium oxide, or other easily chloridizable material which forms a vaporized chloride upon chlorination at a temperature up to 1000° C. may be introduced and chlorinated with the titanium ore. By this means the chlorination reaction initiates more rapidly and substantially all of the chlorine is utilized. While the invention is particularly applicable to treatment of ilmenite, it may be extended to the treatment of other less easily chloridizable ores such as titanomagnetite, or silicon dioxide.

In chlorination of a thick pervious bed of a composition comprising a titanium ore and a more easily chloridizable material, the zones previously discussed are established as previously described. However, due to the presence of the more easily chloridizable material which chlorinates immediately upon introduction of the material into the furnace, considerable chlorination occurs in the uppermost portion of the bed and the dilute chlorine which normally escapes with the chloride vapors is thus removed and utilized. As previously noted, the ore is preheated in the upper portion of the bed. As the ore proceeds downwardly, it enters the intermediate zone where the iron components are chlorinated and finally the titanium residue is chlorinated by the high concentration of incoming chlorine entering the base of the bed. Chlorine as it proceeds upwardly through the bed becomes more and more dilute and finally dilute chlorine enters the upper preheating zone. This dilute chlorine reacts rapidly with the easily chloridizable metal or oxide thereof, and thus is utilized. At the same time, heat evolved during the chlorination heats the titanium ore, thus decreasing the time during which the ore is preheated and hastening an early initiation of the chlorination of the ore.

The accompanying drawing, which is a diagrammatic sectional view of a furnace which may be used in accordance with the present invention will assist in a more complete understanding of the invention. The apparatus comprises a suitable shaft furnace 1, constructed of firebrick or other resistant material and is provided with chlorine tuyères 6, and a discharge 9, for the chloride vapors. A suitable ore feeding device 2, equipped with a star feeder 5, and a storage hopper 7, is mounted upon the top of the furnace. In addition, the furnace is provided at its base with a discharge device 3, equipped with a star discharge and a hopper 8, in which unchlorinated residue is collected.

In the normal operation of this device, a carbonaceous material is burned within the furnace or other means are used to preheat the furnace to a suitable temperature, for example, 850° C. or above. Thereafter, a mixture of ore, easily chloridizable material and carbon are introduced and chlorine is introduced through the tuyères to initiate the reaction. The process may be continued for an indefinite period by continuing the introduction of ore, easily chloridizable material and chlorine and carbon at a rate sufficient to maintain the temperature of the reaction above 700° C., and preferably at 850 to 1250° C. Ore is introduced with sufficient rapidity to maintain the chlorination bed at least 18 inches deep. The depth of the bed also may be regulated by controlling the rate of withdrawal of unchlorinated residue in accordance with the observation of the depth of the bed which may be determined by periodically observing the level of the ore in the furnace. This operation may be assisted by observation of the temperature at various levels within the furnace by raising or lowering thermocouple wires in thermocouple well 10, whereby the zone of reaction indicated by the hotter portions of the furnace may be located.

By reason of the depth of the ore bed the zones of chlorination previously referred to are established. In the lower zone designated at C, the titanium values in the ore are chlorinated by the more concentrated incoming chlorine and due to the high concentration of chlorine at the base of the ore bed substantially complete chlorination of the titanium values is insured. As the gases move upwardly they enter the second zone B, where the major portion of the iron is chlorinated by the chlorine which is diluted with titanium tetrachloride. Thereafter, the gaseous mixture enters third zone A, wherein incoming ore is preheated and the reaction is initiated.

The ore may be chlorinated in a coarse or finely ground state or in the form of briquettes or other suitable form, mixed with the required amount of carbonaceous material such as charcoal, coke or the like. If desired, the ore may be ground to minus 100 mesh or finer, and intimately intermixed with finely divided carbon such as peat, petroleum, or coal, coke, charcoal, etc., the degree of intermixing being that required to obtain a composition which is approximately homogeneous.

The temperature may be regulated by regulating the rate of introduction of chlorine and carbonaceous mixtures or briquettes and easily chloridizable constituent in accordance with periodic or continuous observation of the temperature in the reactor. Thus, if the temperature begins to decrease, the rate of introduction of the chlorine and of the ore-carbon mixtures may be increased, while if the temperature increases, the rate of ore, carbon and chlorine introduction may be decreased. It will also be understood that the temperature may be regulated to some degree by the rate of withdrawal of the chlorinated residue. Thus, a large amount of heat may be dissipated by rapid removal of the residue and the reactor may be cooled by the incoming ore. Cooling may be facilitated, if desired, by introduction of carbon dioxide, nitrogen or other inert gas.

Varying quantities of easily chloridizable material may be introduced into the furnace. In most cases it is found that up to about 25 percent of the easily chloridizable material may be introduced with satisfactory results, although more may be used, if desired. Since the chlorination of these materials produces considerable heat, it is often desirable to utilize large quantities when chlorinating an ore which chlorinates with difficulty in order to maintain the temperature of reaction. The easily chloridizable component may be introduced in the ore briquettes or separately in accordance with observation of the amount of chlorine in the exhaust gas. Thus, this material may be introduced whenever the chlorine content of the gaseous vapors escaping from the furnace exceeds 3 percent by volume.

The following examples illustrate the invention:

*Example I.*—A quantity of briquettes ¼ to ¾ inch in diameter were prepared from a mixture of 100 parts by weight of ilmenite ore, 26 parts by weight of carbon, and 14 parts by weight of molasses by baking at 600° C., until the volatile hydrocarbons were substantially removed. The carbon content of the briquettes was about 20 percent of the weight of the briquettes.

A shaft furnace having an internal diameter of 4 inches was preheated by a coke fire within the shaft at 1000° C. A charge of 5 pounds of briquettes and 3 pounds of coke was introduced and an air blast maintained for 3 minutes through the shaft to insure the ignition of the added coke. At this time, 10 pounds of briquettes and 3 pounds of finely divided ferrotitanium were added and chlorine introduced into the shaft to initiate the reaction. Chlorine was introduced at a rate of 75–80 liters per minute, while briquettes were added at the rate of 20 pounds per hour and ferrotitanium containing 60 percent titanium and the balance iron at 2 pounds per hour, and the depth of the ore bed maintained at 6 feet, measured from the point of chlorine introduction to the top of the bed. For a period of over 24 hours the temperature of the reaction mass was very readily maintained at 940° C. to over 1100° C. An ash containing 15% $TiO_2$ and 5% Fe was withdrawn from the furnace. Over 98% of the titanium introduced was volatilized as titanium tetrachloride and 98% of the iron was volatilized as iron chloride and the chlorine utilization exceeded 97%.

*Example II.*—Using a furnace having an internal diameter of 15 inches which was preheated to a temperature of 1000° C., briquettes prepared from a mixture corresponding to 100 parts ore to 23 parts C to 14 parts molasses, were introduced at a rate of 175 pounds per hour together with 75 pounds per hour of ferric oxide and chlorine introduced at 4.5 to 5 pounds per minute, the depth of the ore bed being maintained at 24 inches. A substantially complete chlorine utilization was obtained.

Hydrogen chloride, phosgene, carbon tetrachloride, or other gaseous chlorinating agent may be used in conjunction with or in lieu of chlorine in accordance with our invention.

Although the present invention has been described with reference to specific details of certain embodiments thereof, it is not intended that such details shall be regarded as limitations upon the scope of the invention, except insofar as included in the accompanying claims.

This application is a continuation-in-part of our copending application Serial No. 306,877, filed November 30, 1939, which was in turn a continuation-in-part of our application Serial No. 282,198, filed June 30, 1939, now Patent No. 2,184,887, granted December 26, 1939.

We claim:

1. A method which comprises forming a pervious bed within a reactor comprising a titanium bearing material which contains at least 10 percent titanium and at least 10 percent iron and sufficient reducing agent to cause formation of iron chloride and a major quantity of titanium tetrachloride, introducing a chlorination agent into a lower portion of the bed and further portions of said material and reducing agent into an upper portion of the bed at a rate such that the heat evolved is sufficient to maintain the temperature within at least a portion of the bed above 700° C. without externally heating the reactor, withdrawing vaporized chlorides from said upper portion and regulating the rate of introduction of the material to insure a bed having a depth of at least 18 inches measured from the point at which the chlorine is introduced into the bed to the top of the bed.

2. The process of claim 1 wherein the depth of the bed is at least 3 feet.

3. The process of claim 1 wherein the reducing agent is carbonaceous.

4. The process of claim 1 wherein the temperature is maintained at 850 to 1250° C.

5. A method of chlorinating an iron titanium ore containing at least 10 percent titanium and at least 10 percent iron which comprises chlorinating the ore in the presence of a quantity of added iron oxide in addition to the iron oxide normally present in the ore and in amount sufficient to supply additional heat to the ore upon chlorination of the iron oxide and at a temperature sufficiently high to volatilize the chlorides formed.

6. A method of chlorinating an iron titanium ore which contains at least 10 percent titanium and 10 percent iron which comprises forming a pervious bed of said ore and a carbonaceous reducing agent, introducing chlorine into the base of the bed, withdrawing vaporized metallic halides from the upper portion of the bed, withdrawing vaporized metallic chlorides from the upper portion of the bed and introducing ore reducing agent and additional iron oxide into said upper portion the added iron oxide being in addition to that normally present in the ore and the amount thereof being sufficient to supply substantial additional heat to the ore upon chlorination of the iron oxide.

7. A method of chlorinating an iron titanium ore containing at least 10 percent titanium and at least 10 percent iron which comprises forming a pervious bed of said material and an additional more easily chloridizable material in amount sufficient to supply substantial additional heat to the ore upon chlorination of the easily chloridizable material and chlorinating the bed at a temperature not less than about 700° C.

8. The process of claim 1 wherein the more easily chloridizable material is a member of the group consisting of metals and metal oxides.

9. The process of claim 1 wherein the process is conducted in a continuous manner, ore and easily chloridizable material being introduced into and vaporized chlorides withdrawn from one portion of the bed and chlorine into another portion of the bed.

10. The process of claim 1 wherein the depth of the bed is at least 3 feet and the temperature is maintained at 850 to 1250° C.

11. A continuous method of producing titanium tetrachloride which comprises forming a pervious bed of carbonaceous reducing agent in amount to cause formation of iron and titanium chlorides and a titanium bearing material which contains at least 10 percent of titanium and at least 10 percent iron, introducing chlorine into a lower portion of the bed, withdrawing vaporized metallic chlorides from the upper portion of the bed, maintaining the temperature within at least a portion of the bed above 700° C., introducing the material and carbonaceous agent into said upper portion and regulating the rate of introduction to maintain the hottest portion of the bed at least 6 inches below the top thereof and to insure a bed having a depth of at least 18 inches measured from the point at which chlorine is introduced into the bed to the top of the bed.

12. The process of claim 1 wherein the titanium bearing material is ilmenite ore.

13. A method of chlorinating an iron titanium ore containing at least 10 percent titanium which comprises adding a substantial quantity of metallic titanium to said ore and chlorinating the ore in the presence of said metal at a temperature sufficiently high and with sufficient chlorinating agent to volatilize iron and titanium chlorides.

14. A method of chlorinating an iron titanium ore containing at least 10 percent titanium which comprises establishing a pervious bed of ore and carbon, introducing chlorine into one portion of the bed, maintaining the temperature of chlorination and the chlorine concentration sufficiently high to vaporize metallic chlorides which are formed, withdrawing vaporized chloride from another portion of said bed and introducing ore, carbon, and a substantial quantity of metallic titanium which is more easily chloridizable adjacent said other portions of the bed.

IRVING E. MUSKAT.
ROBERT H. TAYLOR.

CERTIFICATE OF CORRECTION.

Patent No. 2,253,471. August 19, 1941.

IRVING E. MUSKAT, ET AL.

It is hereby certified that error appears in the printed specification of the above numbered patent requiring correction as follows: Page 3, second column, lines 48 and 51, claims 8 and 9 respectively, for the claim reference numeral "1" read --7--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.